US012649422B2

(12) United States Patent
Choi et al.

(10) Patent No.: US 12,649,422 B2
(45) Date of Patent: Jun. 9, 2026

(54) GARMENT HANGER APPARATUSES AND METHOD OF HANGING GARMENTS

(71) Applicant: GM GLOBAL TECHNOLOGY OPERATIONS LLC, Detroit, MI (US)

(72) Inventors: Leeyong Choi, Gwangmyeong-si (KR); Soyoung Lim, Incheon (KR); Jinho Choi, Incheon (KR); Seungil Lim, Seoul (KR); Hong Liu, Weihai (CN); Solhee Bong, Songpa-gu (KR); Soyeon Kim, Suwon-si (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 208 days.

(21) Appl. No.: 18/646,913

(22) Filed: Apr. 26, 2024

(65) Prior Publication Data

US 2025/0333005 A1      Oct. 30, 2025

(51) Int. Cl.
| | |
|---|---|
| B60R 7/10 | (2006.01) |
| A47G 25/02 | (2006.01) |
| B60R 7/04 | (2006.01) |
| B60R 11/00 | (2006.01) |

(52) U.S. Cl.
CPC ............... B60R 7/10 (2013.01); B60R 7/043 (2013.01); A47G 25/02 (2013.01); B60R 2011/0015 (2013.01)

(58) Field of Classification Search
CPC .............. B60R 7/043; B60R 7/04; B60R 7/10
See application file for complete search history.

(56) References Cited

U.S. PATENT DOCUMENTS

| | | | | |
|---|---|---|---|---|
| 2,262,581 | A  * | 11/1941 | Gonczy | A47C 7/64 |
| | | | | 297/188.05 |
| 4,711,488 | A  * | 12/1987 | Ohanessian | A47C 7/64 |
| | | | | 297/188.03 |
| 6,220,489 | B1 * | 4/2001 | Sato | B60R 7/043 |
| | | | | 224/927 |
| 6,260,750 | B1 * | 7/2001 | Chiang | B60R 7/10 |
| | | | | 224/275 |
| 6,443,523 | B1 * | 9/2002 | Reitze | B60R 7/043 |
| | | | | 297/188.05 |
| 6,808,093 | B1 * | 10/2004 | Lin | A47C 7/64 |
| | | | | 297/188.03 |
| 7,063,381 | B2 * | 6/2006 | Scahill | A47C 7/64 |
| | | | | 248/295.11 |
| 7,784,864 | B2 * | 8/2010 | Feder | B60R 7/043 |
| | | | | 297/188.2 |

(Continued)

FOREIGN PATENT DOCUMENTS

| | | |
|---|---|---|
| DE | 29920466 U1 | 1/2000 |
| DE | 102006001778 A1 | 7/2007 |

*Primary Examiner* — Brian D Nash
(74) *Attorney, Agent, or Firm* — Ingrassia Fisher & Lorenz, LLP | IF&L

(57) ABSTRACT

Garment hanger apparatuses and methods are provided for hanging garments. An apparatus includes a bracket secured to a seatback of a seat assembly, a hanger assembly configured to extend from the bracket to define a deployed configuration and to retract toward the bracket to define a stowed configuration, wherein the hanger assembly includes surfaces that are configured to support a garment hanging therefrom while in the deployed configuration, and one or more extension members coupling the hanger assembly to the bracket.

20 Claims, 11 Drawing Sheets

(56)                References Cited

U.S. PATENT DOCUMENTS

| | | | | |
|---|---|---|---|---|
| 8,573,689 | B2 * | 11/2013 | Golo | B60R 7/10 |
| | | | | 297/188.03 |
| 9,277,835 | B1 * | 3/2016 | Jindal | B60R 7/10 |
| 2003/0184134 | A1 * | 10/2003 | Liu | A47C 7/64 |
| | | | | 297/188.03 |
| 2006/0243764 | A1 * | 11/2006 | Chiang | B60R 7/10 |
| | | | | 223/85 |
| 2007/0108241 | A1 * | 5/2007 | Bass | A45F 5/021 |
| | | | | 224/258 |
| 2019/0001854 | A1 * | 1/2019 | Gunn | B60N 2/90 |
| 2019/0039527 | A1 * | 2/2019 | Herman | B60R 7/10 |

* cited by examiner

GARMENT HANGER APPARATUSES AND METHOD OF HANGING GARMENTS

INTRODUCTION

The technical field generally relates to garment storage in vehicles, and more particularly relates to seat assemblies having an integrated garment hanger apparatus.

In today's automotive designs, it's common to find a basic hook disposed on the upper rear seat door handle. While this feature serves its purpose adequately, it does come with certain limitations. One such limitation is its inability to provide sufficient storage space for clothing items, necessitating the use of an additional hanger. This supplementary arrangement often leads to a cluttered interior, diminishing the overall aesthetic appeal and functionality of the vehicle's cabin.

Moreover, the reliance on separate hangers for clothing storage introduces the potential for increased noise levels during transit. As the vehicle moves, the garments hanging from these hooks may sway and collide with other objects, resulting in distracting sounds that can disrupt the driver's focus and concentration. Such disturbances pose a risk to safe driving practices, as they may divert the driver's attention away from the road ahead.

Accordingly, it is desirable to provide systems and methods for storing garments in vehicles that addresses at least some of the shortcomings noted above. Furthermore, other desirable features and characteristics of the present disclosure will become apparent from the subsequent detailed description and the appended claims, taken in conjunction with the accompanying drawings and the foregoing introduction.

SUMMARY

A garment hanger apparatus is provided for hanging garments. In one example, the apparatus includes a bracket secured to a seatback of a seat assembly, a hanger assembly configured to extend from the bracket to define a deployed configuration and to retract toward the bracket to define a stowed configuration, wherein the hanger assembly includes surfaces that are configured to support a garment hanging therefrom while in the deployed configuration, and one or more extension members coupling the hanger assembly to the bracket.

In various examples, the hanger assembly of the garment hanger apparatus includes a pair of hanger wings coupled to oppositely disposed ends of the hanger assembly, the pair of hanger wings each including garment contact surfaces that are contoured to slope downward relative to the seat assembly.

In various examples, the hanger assembly of the garment hanger apparatus includes a hanger housing, and the pair of hanger wings are configured to be extended from the hanger housing when the hanger assembly is moved to the deployed configuration and are configured to be retracted within the hanger housing when the hanger assembly is moved to the stowed configuration.

In various examples, the hanger assembly of the garment hanger apparatus is lockable in both the deployed configuration and the stowed configuration, and the hanger assembly includes a release mechanism configured to unlock the hanger assembly to allow transition between the deployed configuration and the stowed configuration, wherein actuation of the release mechanism is configured to cause transition of the pair of hanger wings to be extended from or retracted within the hanger housing.

In various examples, the hanger housing of the garment hanger apparatus includes guide slots and each of the pair of hanger wings includes a guide pin configured to extend into a corresponding one of the guide slots, wherein the guide slots and the guide pins in combination are configured to guide the pair of hanger wings when extending from or retracting into the hanger housing.

In various examples, the bracket of the garment hanger apparatus includes wing protrusions configured to be received within wing recesses while the hanger assembly is in the stowed configuration.

In various examples, the hanger assembly of the garment hanger apparatus is lockable in both the deployed configuration and the stowed configuration, and the hanger assembly includes a release mechanism configured to unlock the hanger assembly to allow for transition between the deployed configuration and the stowed configuration.

In various examples, each of the one or more extension members of the garment hanger apparatus include an extension rod extending therein, a locking member therein that includes a locking pin, and a lock hole, wherein the locking member is biased such that the locking pin is preferentially received within the lock hole when the locking pin and the lock hole are aligned, wherein the hanger assembly is locked in position while the locking pin is within the lock hole, wherein actuation of the release mechanism causes a distal end of the extension rod to interact with the locking member and force the locking pin out of the lock hole to thereby unlock the hanger assembly.

In various examples, exteriors surfaces of the hanger assembly of the garment hanger apparatus are flush with or recess relative to exterior surfaces of the bracket while the hanger assembly is in the stowed configuration.

In various examples, the hanger assembly of the garment hanger apparatus is configured to support the garment hanging therefrom while in the deployed configuration such that the garment is not in contact with the seatback.

A method is provided for hanging garments. In one example, the method includes extending a hanger assembly of a garment hanger apparatus from a bracket secured to a seatback of a seat assembly, wherein the hanger assembly is coupled to the bracket by one or more extension members, locking the hanger assembly in a deployed configuration, hanging a garment from surfaces of the hanger assembly while in the deployed configuration, and retracting the hanger assembly toward the bracket to a stowed configuration.

In various examples, the method may include extending a pair of hanger wings from oppositely disposed ends of a hanger housing of the hanger assembly when the hanger assembly is moved to the deployed configuration, wherein the pair of hanger wings each include garment contact surfaces that are contoured to slope downward relative to the seat assembly, and retracting the pair of hanger wings within the hanger housing when the hanger assembly is moved to the stowed configuration.

In various examples, the method may include guiding the pair of hanger wings when extending from or retracting into the hanger housing with a guide pin of each of the pair of hanger wings disposed within a guide slot of the hanger housing.

In various examples, the method may include securing the pair of hanger wings within the bracket by receiving wing protrusions of the bracket within wing recesses of the pair of hanger wings while the hanger assembly is in the stowed configuration.

In various examples, the method may include unlocking the hanger assembly prior to retracting the hanger assembly to the stowed configuration.

In various examples, the method may include actuating a release mechanism to unlock and lock the hanger assembly to allow for transition between the deployed configuration and the stowed configuration, wherein each of the one or more extension members include an extension rod extending therein, a locking member therein that includes a locking pin, and a lock hole, wherein the locking member is biased such that the locking pin is preferentially received within the lock hole when the locking pin and the lock hole are aligned, wherein the hanger assembly is locked in position while the locking pin is within the lock hole, wherein actuation of the release mechanism causes a distal end of the extension rod to interact with the locking member and force the locking pin out of the lock hole to thereby unlock the hanger assembly.

In various examples, the garment of the method is not in contact with the seatback while hanging from the hanger assembly.

A vehicle is provided that, in one example, includes a seat assembly, and a garment hanger apparatus. The garment hanger apparatus may include a bracket secured to a seatback of the seat assembly, a hanger assembly configured to extend from the bracket to define a deployed configuration and to retract toward the bracket to define a stowed configuration, wherein the hanger assembly includes surfaces that are configured to support a garment hanging therefrom while in the deployed configuration, and one or more extension members coupling the hanger assembly to the bracket.

In various examples, the hanger assembly of the vehicle includes a pair of hanger wings coupled to oppositely disposed ends of a hanger housing of the hanger assembly, and the pair of hanger wings are configured to be extended from the hanger housing when the hanger assembly is moved to the deployed configuration and are configured to be retracted within the hanger housing when the hanger assembly is moved to the stowed configuration.

In various examples, the hanger assembly of the vehicle is lockable in both the deployed configuration and the stowed configuration, and the hanger assembly includes a release mechanism configured to unlock the hanger assembly to allow transition between the deployed configuration and the stowed configuration, wherein actuation of the release mechanism is configured to cause transition of the pair of hanger wings to be extended from and retracted within the hanger housing.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction or the following detailed description.

Figure 1:
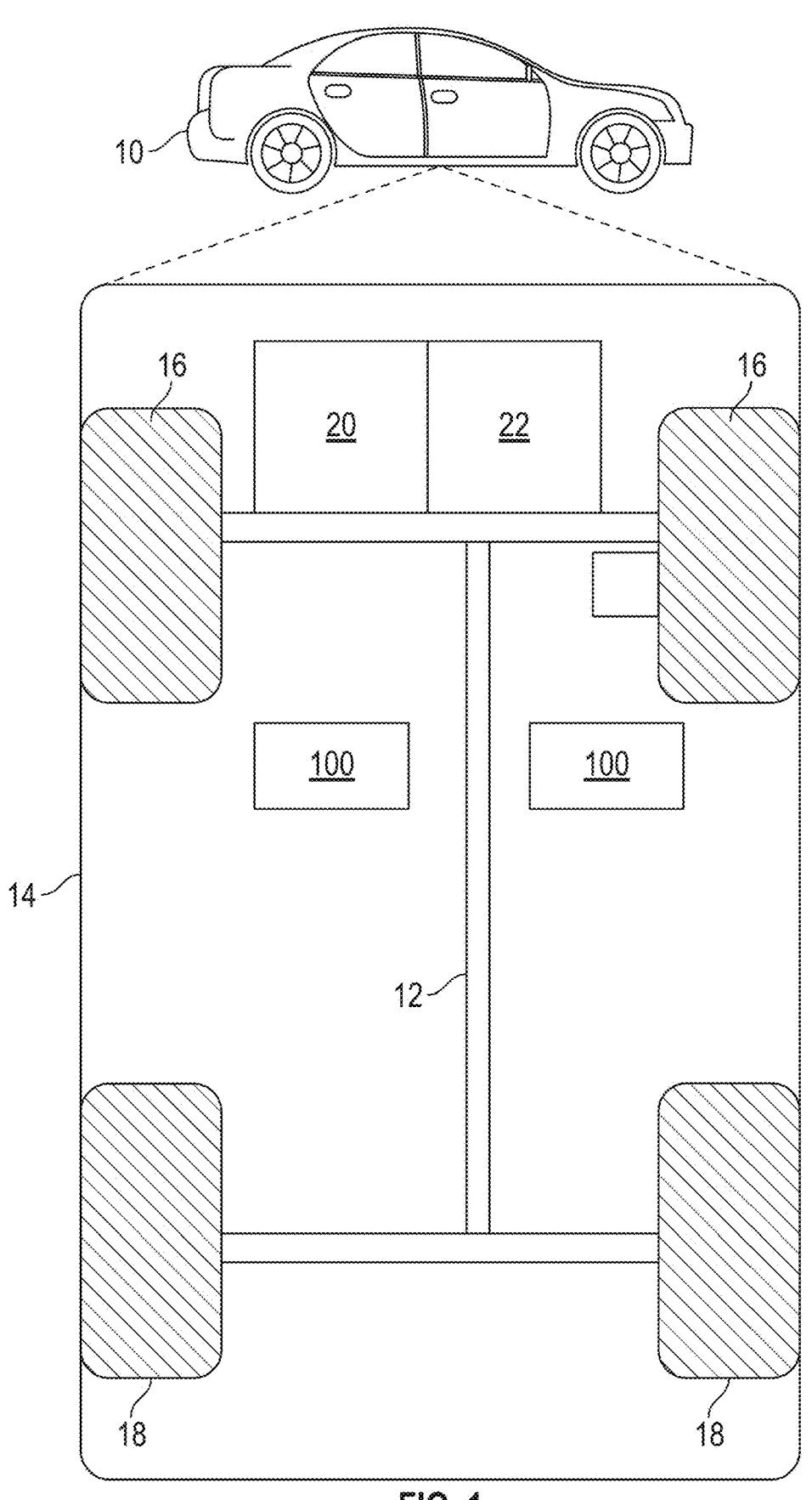
FIG. 1 is a functional block diagram of a vehicle having a garment hanger apparatus in accordance with an example.

FIG. 1 illustrates a vehicle 10, according to an example. In certain examples, the vehicle 10 comprises an automobile. The vehicle 10 includes one or more seat assemblies 100 each having a garment hanger apparatus 108 (as shown in the following figures) for hanging clothes within the vehicle 10. In various examples, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles or mobile platforms in certain examples.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. The vehicle 10 further includes a propulsion system 20, a transmission system 22, and one or more seat assemblies 100. The propulsion system 20 includes an engine and/or motor such as an internal combustion engine (e.g., a gasoline or diesel fueled combustion engine), an electric motor (e.g., a 3-phase AC motor), or a hybrid system that includes more than one type of engine and/or motor. The transmission system 22 is configured to transmit power from the propulsion system 20 to the wheels 16-18 according to selectable speed ratios. According to various examples, the transmission system 22 may include a step-ratio automatic transmission, a continuously-variable transmission, or other appropriate transmission.

FIGS. 2-16 illustrate various nonlimiting examples of the seat assemblies 100. It should be noted that these examples are merely for illustrative purposes and the seat assembly 100 of FIG. 1 may have other configurations, including various combinations of the components represented in FIGS. 2-16.

The seat assembly 100 may include a frame (not shown) secured to a floor of the vehicle 10, a seat cushion 102 coupled to the frame, a seatback 104 secured at a lower end thereof to the seat cushion 102 and/or the frame, and a headrest assembly 106 secured to an upper end of the seatback 104. The seat cushion 102 is configured to support an occupant seated thereon, the seatback 104 is configured to support the occupant's back while seated on the seat cushion 102, and the headrest assembly 106 is configured to support the occupant's head. The seat assembly 100 may include various components that provide for adjustment of thereof, such as systems for adjusting a height of the seat cushion 102, a recline angle of the seatback 104, lumbar support, and a height of the headrest assembly 106 relative to an upper end of the seatback 104. The seat cushion 102, the seatback 104, and the headrest assembly 106 may each include a cushion body formed of, for example, a polymeric foam material encased within a cover formed of, for example, a fabric, polymeric, or leather material.

Figure 2:
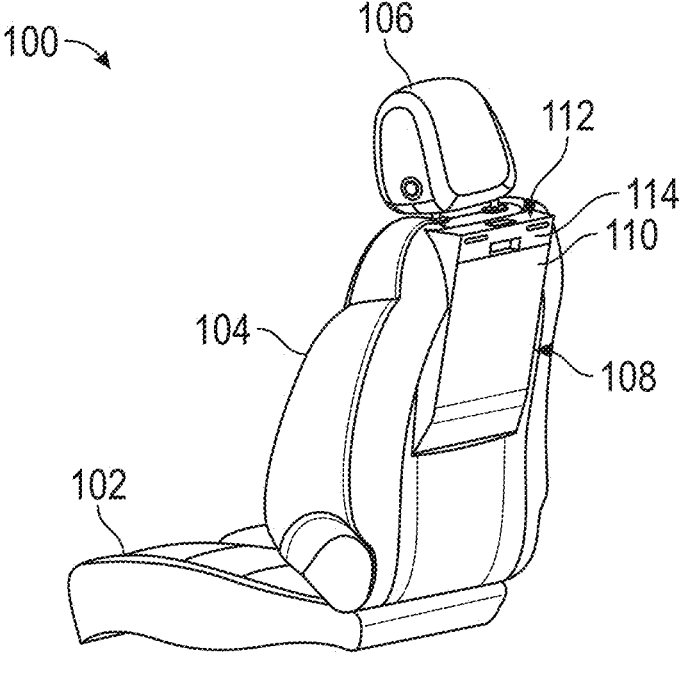
FIGS. 2 and 3 are a perspective views of a seat assembly illustrating the garment hanger apparatus in a stowed configuration and a deployed configuration, respectively in accordance with an example.
Figure 3:
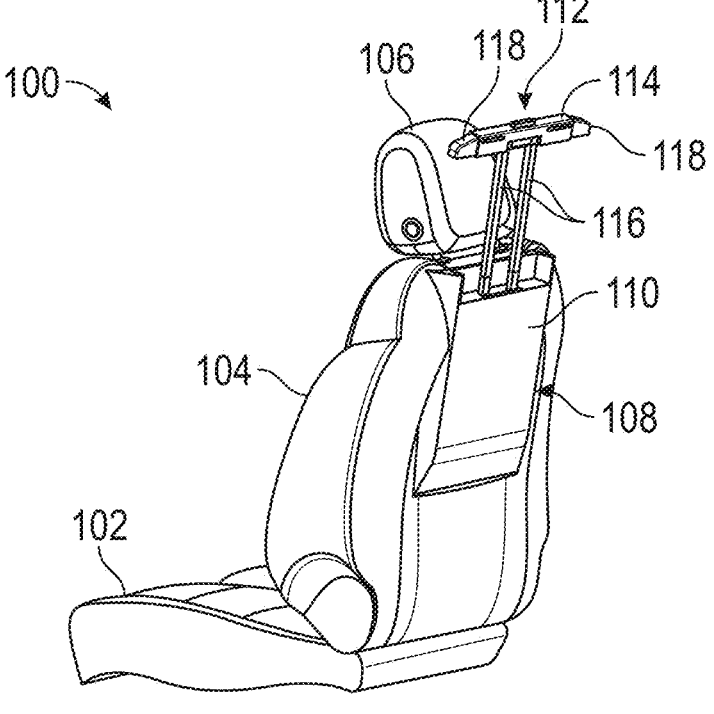
Figures 4, 5:
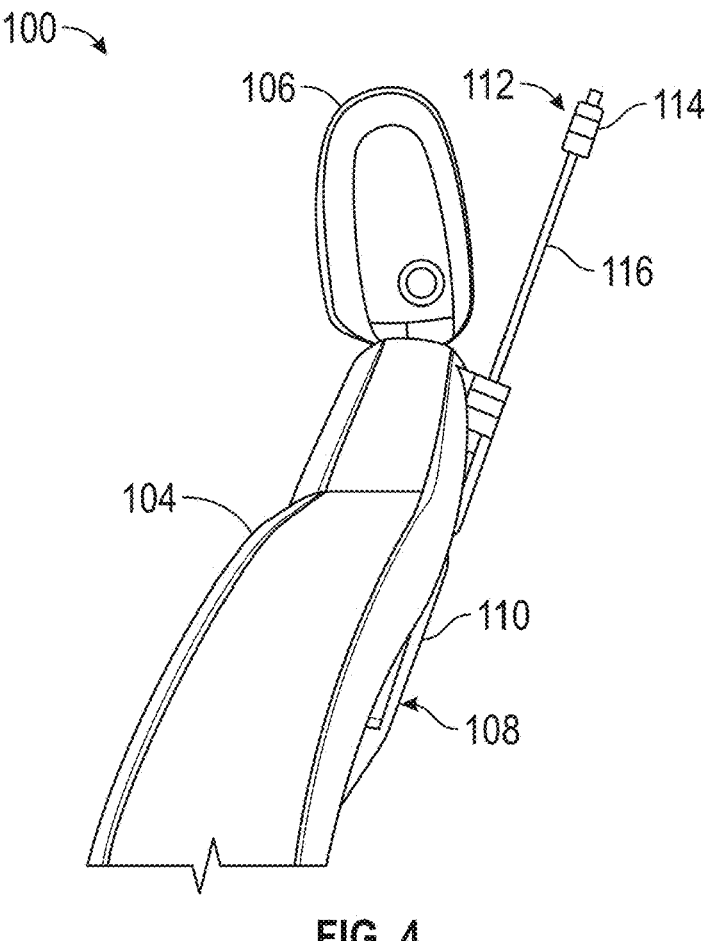
FIG. 4 is a side view of the seat assembly of FIGS. 2 and 3 with the garment hanger apparatus in the deployed configuration in accordance with an example.
FIG. 5 is an isolated view of a hanger assembly of the garment hanger apparatus of FIGS. 2-4 while in the stowed configuration in accordance with an example.

The seat assembly 100 includes the garment hanger apparatus 108 having a bracket 110 secured to the rear of the seatback 104 (i.e., facing a rear of the vehicle 10). The apparatus 108 includes a deployable hanger assembly 112 that includes surfaces configured to support a garment hanging therefrom within the vehicle 10, such as coats, shirts, dresses, etc. FIG. 2 represents the apparatus 108 in a stowed configuration wherein the hanger assembly 112 is retracted into the bracket 110, and FIGS. 3-4 represent the apparatus 108 is a deployed configuration wherein the hanger assembly 112 is extended from the bracket 110. The bracket 110 and the hanger assembly 112 are coupled by one or more extension members 116. The extension members 116 may be received within, slidable within, and retained at least partially within extension member slots 156 of the bracket 110. In some examples, the hanger assembly 112 is configured to support the garment hanging therefrom while in the deployed configuration such that the garment is not in contact with the seatback 104.

Figure 6:
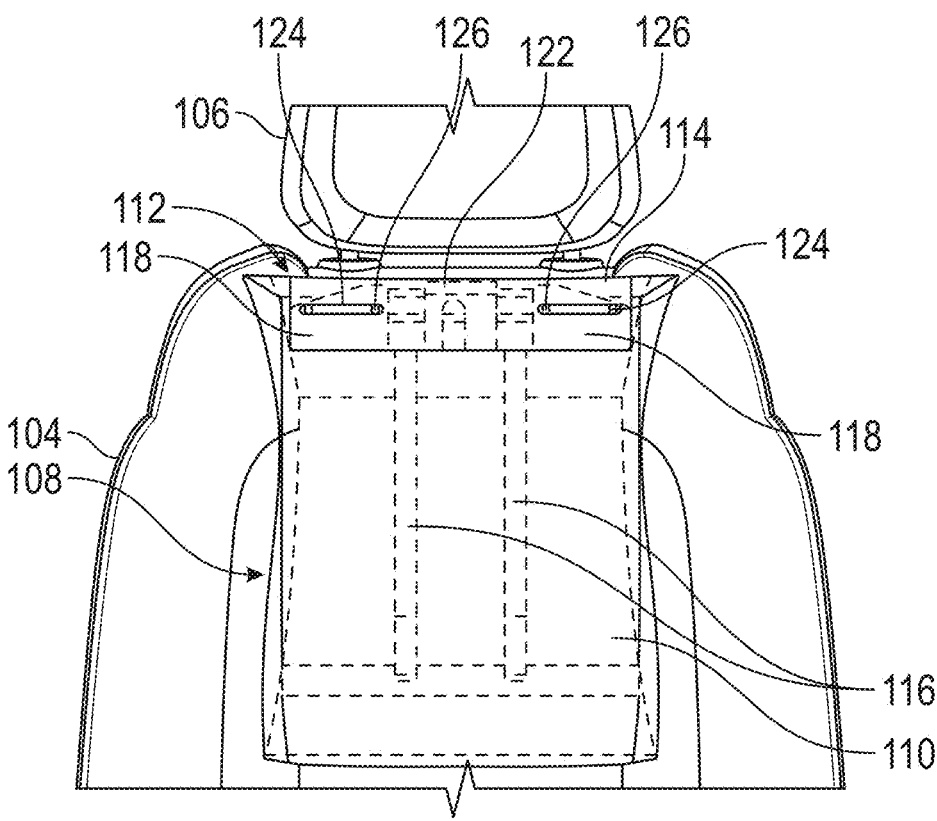
FIGS. 6 and 7 are rear and perspective views of the garment hanger apparatus with a bracket thereof presented as transparent for clarity in accordance with an example.
Figure 7:
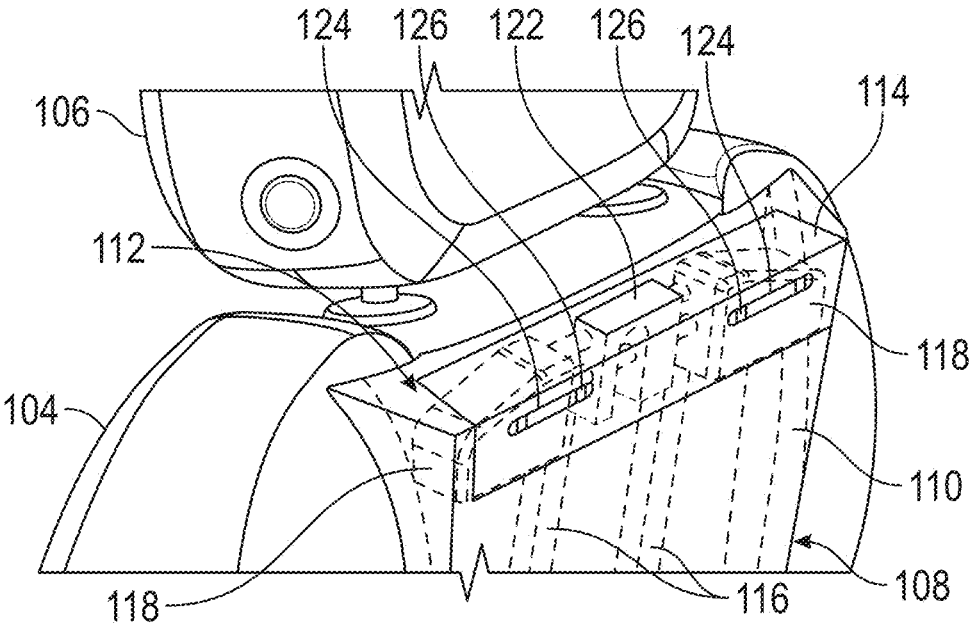
Figure 8:
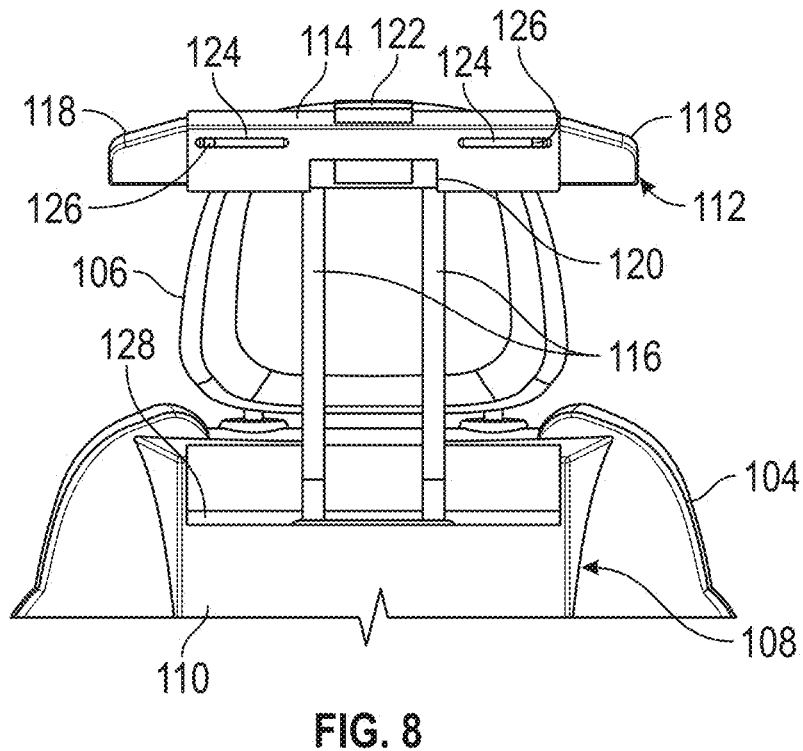
FIGS. 8 and 9 are rear and perspective views of the hanger assembly of FIGS. 2-7 in the deployed configuration in accordance with an example.
Figure 9:
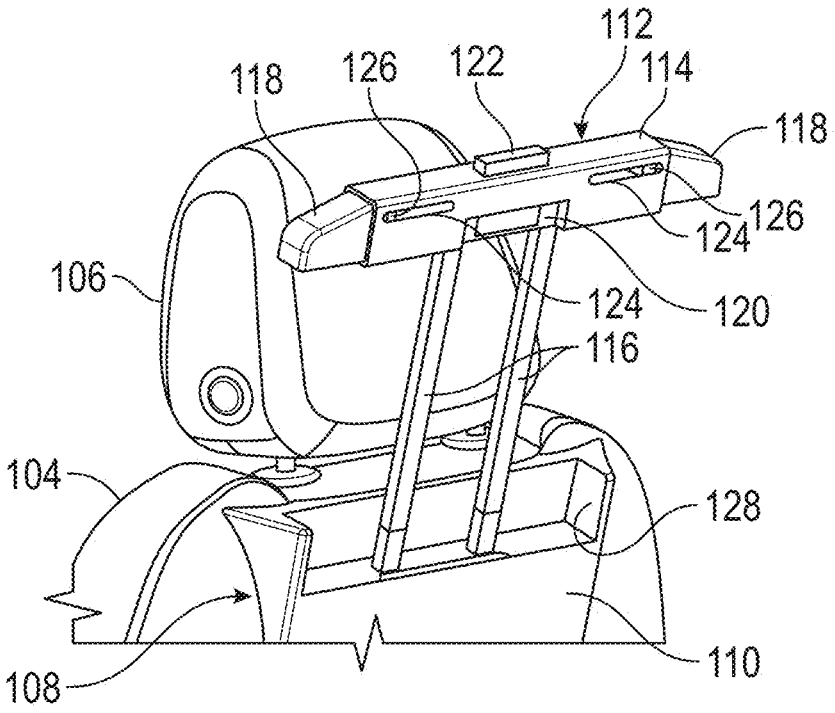

FIG. 5 is an enlarged view of a hanger housing 114 of the hanger assembly 112 while in the stowed configuration. As represented, exterior surfaces of the hanger assembly 112 and/or the hanger housing 114 may be flush with or recessed relative to exterior surfaces of the bracket 110 while the hanger assembly 112 is in the stowed configuration. In the example of the figures, the hanger assembly 112 is configured to be received within a hanger assembly recess 128 of the bracket 110. FIGS. 6 and 7 represent the hanger assembly 112 in the stowed configuration with the bracket 110 and the hanger housing 114 transparent to promote ease of illustrating the positions of various components of the apparatus 108 while the hanger assembly 112 is in the stowed position. FIGS. 8 and 9 represent enlarged views of the hanger assembly 112 while in the deployed configuration.

In some examples, the hanger assembly 112 is lockable in both the deployed configuration and the stowed configuration, and the hanger assembly 112 may include a release mechanism (e.g., a push button 122) configured to unlock the hanger assembly 112 to allow for transition between the deployed configuration and the stowed configuration.

Figure 10:
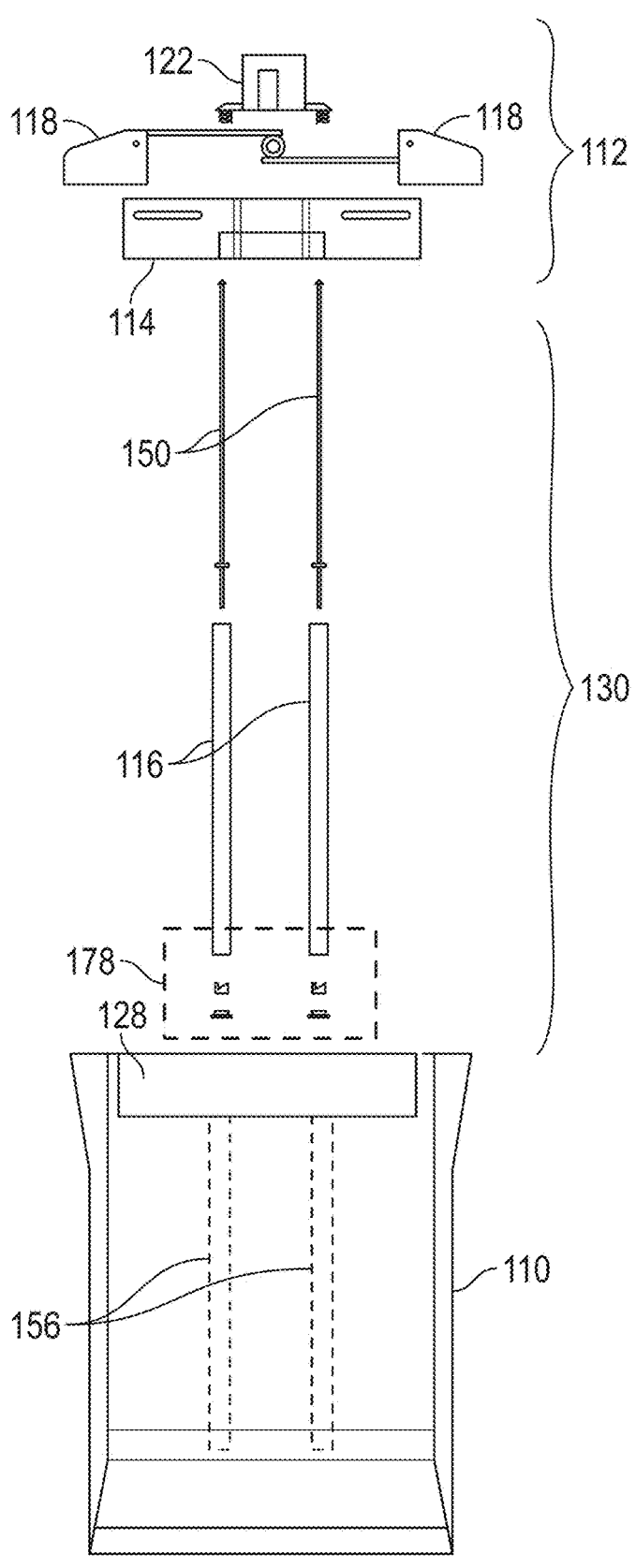
FIGS. 10, 11, 12, and 13 are exploded view illustrating various components of the garment hanger apparatus of FIGS. 2-9 in accordance with an example.
Figure 11:
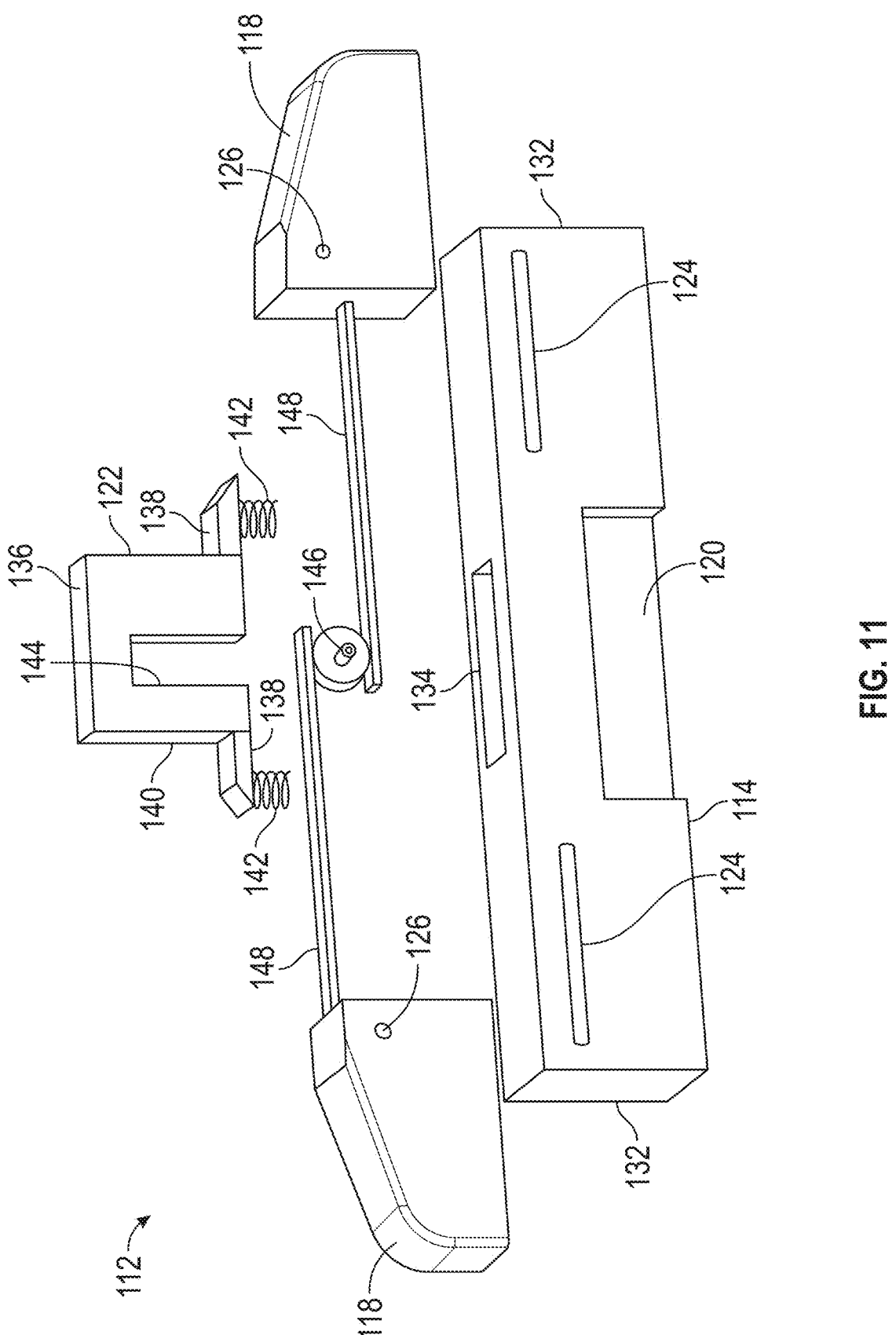
Figure 12:
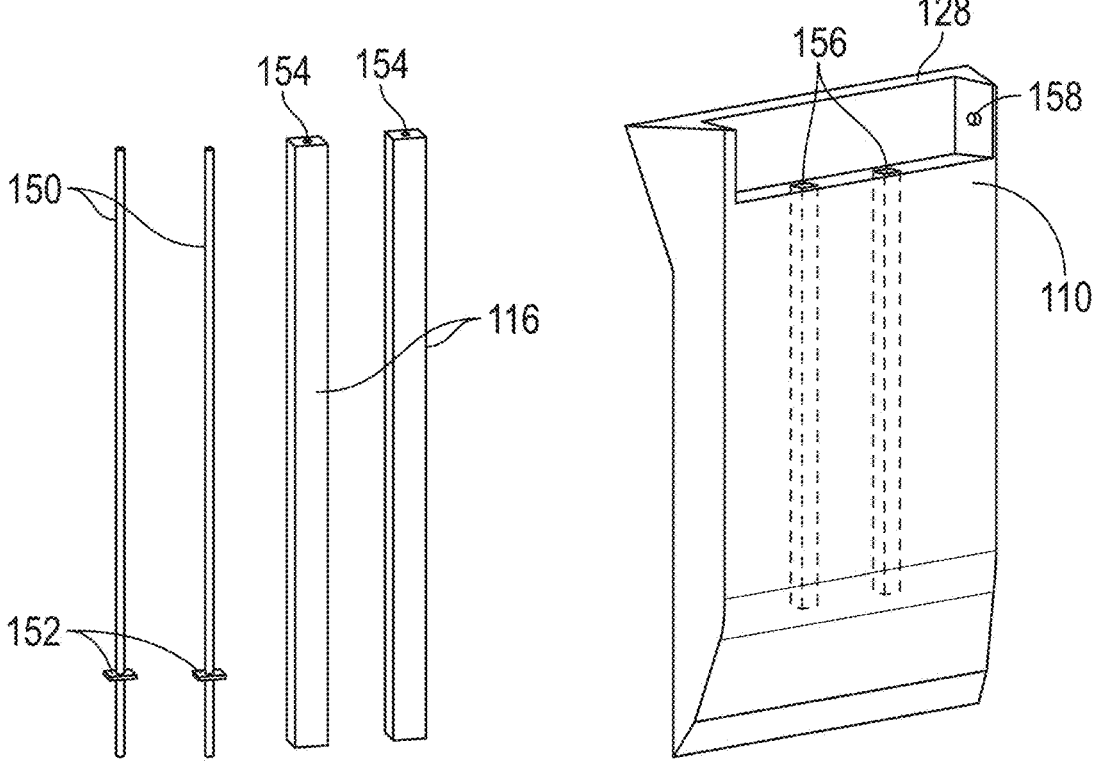

In the example of FIGS. 10-11, the push button 122 includes a body 136 having a generally rectangular shape configured to be received within and moved within a push button cavity 134 of the hanger housing 114. The push button 122 may include guide rails 140 configured to be received within recesses (not shown) in sidewalls of the push button cavity 134 to guide the push button 122 during movement in the push button cavity 134. The push button 122 may be biased toward the opening of the push button cavity 134 by one or more biasing members 142, and may be retained within the push button cavity 134 by one or more retaining members 138.

FIGS. 10, 12-13, and 16 represents various components of a locking mechanism configured to selectively lock and unlock the hanger assembly 112 in at least the deployed and stowed configurations. In this example, each of the extension members 116 may include an extension rod 150 within a cavity therein configured to slide within the extension member 116. An upper portion of the extension rod 150 may extend from the extension member 116 through an extension rod hole 154. Each of the extension rods 150 may include at least one spacer 152 configured to maintain a lateral position of the extension rod 150 within the corresponding extension member 116. Ends of the extension members 116 may be closed with end caps 170.

Figure 13:
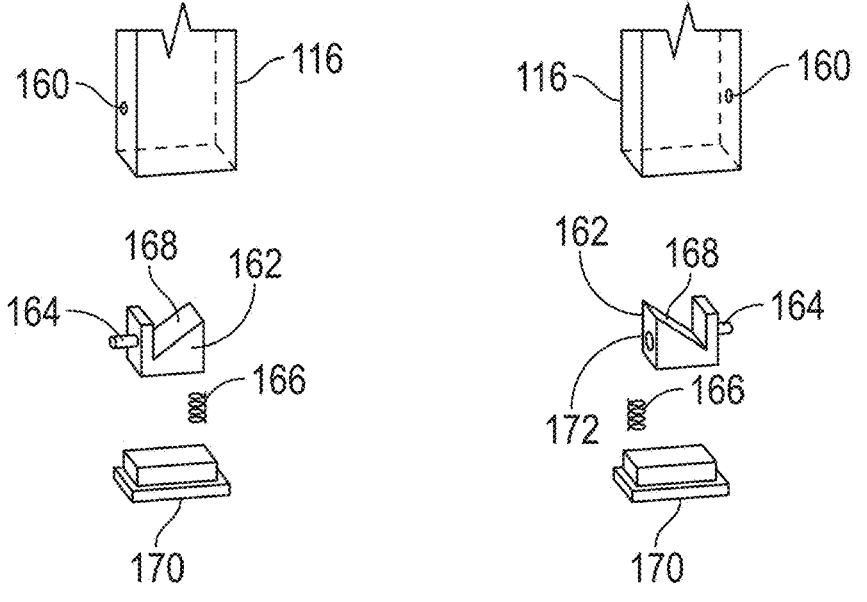
Figures 14, 15:
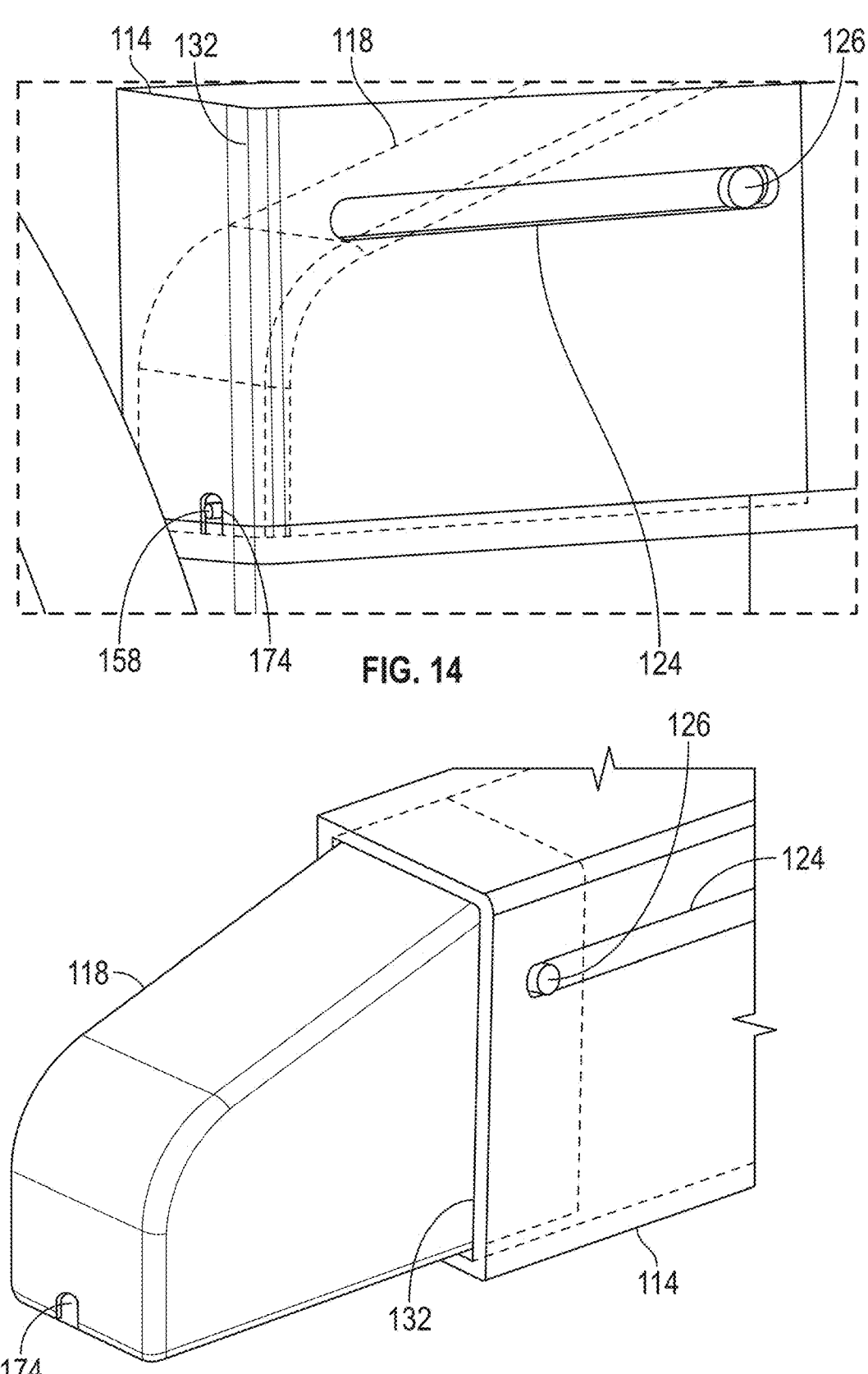
FIGS. 14 and 15 are enlarged views of wings that are retracted and extended, respectively, from the hanger assembly of FIGS. 2-9 in accordance with an example.
Figure 16:
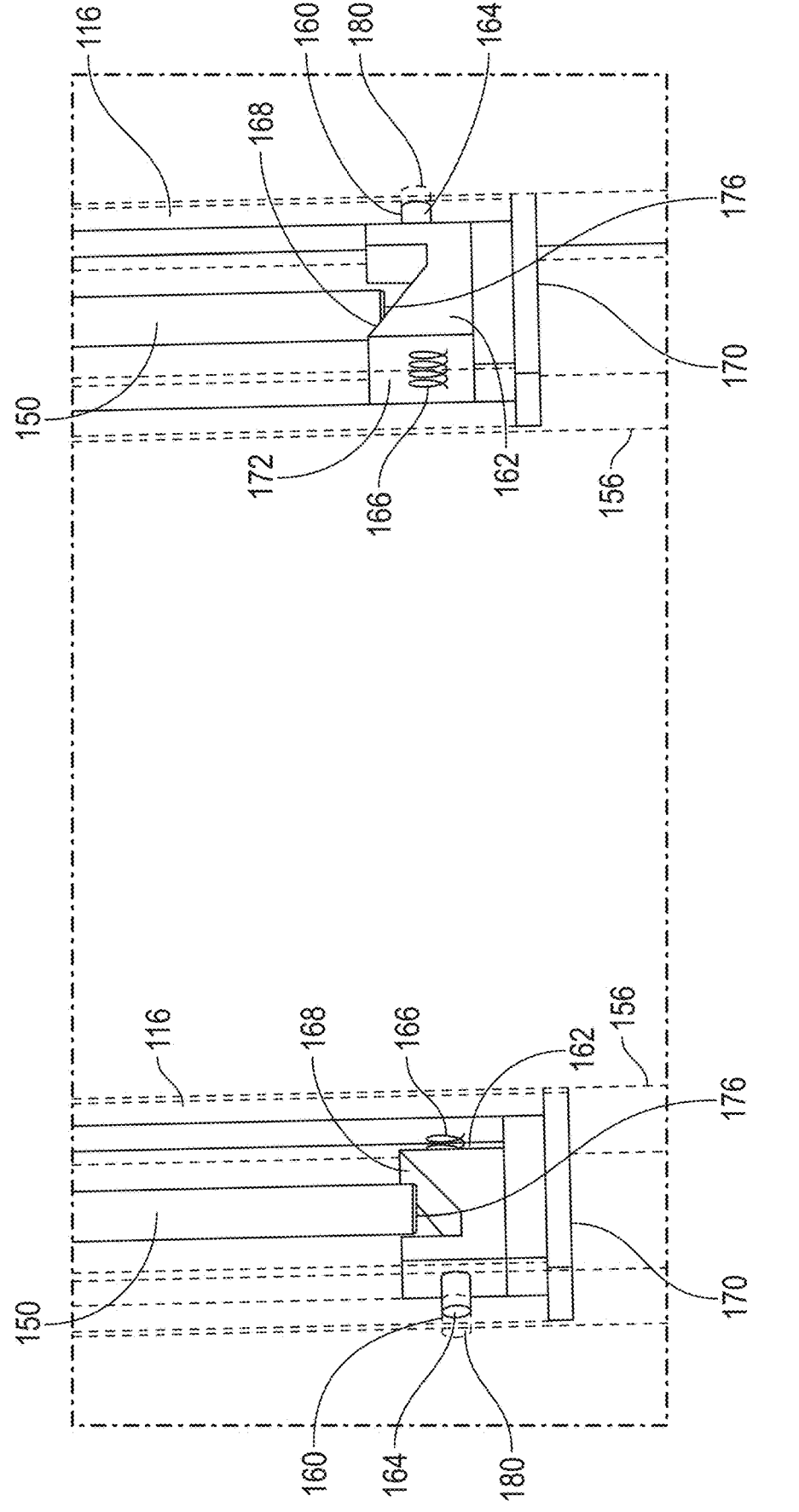
FIG. 16 is an enlarged view of a locking mechanism of the garment hanger apparatus of FIGS. 2-15 in accordance with an example.

Locking members 162 are disposed within the extension members 116 adjacent a lower end of the extension rods 150. The locking members 162 include a locking pin 164 extending laterally from a side thereof that is aligned with a corresponding lock hole 160 in the extension member 116. The locking mechanism may be biased with a biasing member 166 secured in a biasing member recess 172 such that the locking pin 164 is preferentially received within the lock hole 160 and extends therethrough out of the extension member 116. The bracket 110 may include recesses 180 along sides of the extension member slots 156 configured to receive the locking pin 164, and while the locking pin 164 is received within one of the recesses 180 of the bracket 110, the hanger assembly 112 may be locked in position. Notably, the bracket 110 may include any quantity of the recesses 180 along the extension member slots 156 such that the extendable position of the extension members 116, and therefore the hanger assembly 112, may be adjustable to accommodate garments of various lengths. In FIG. 13, the locking members 162, the biasing members 166 and the end caps 170 are collectively labeled with a box 178, and the extension members 116, the extension rods 150 and the components with the box 178 are collectively labeled as an extension assembly 130.

In some examples, actuation of the push button 122 may cause a distal end 176 of the extension rods 150 to interact with the locking member 162 to force the locking pin 164 out of the lock hole 160 such that the locking pin 164 is not extending from the extension members 116 or otherwise received within one of the recesses 180 of the bracket 110 to thereby unlock the hanger assembly 112. In the example of the figures, actuation of the push button 122 causes the distal end 176 of the extension rod 150 to move toward a lower end of the extension members 116 and contact a sloped surface 168 of the locking member 162. As the extension rod 150 moves toward the sloped surface 168, the locking member 162 is forced away from the lock hole 160 compressing the biasing member 166. Upon release of the push button 122, the distal end 176 of the extension rod 150 moves upward removing the force upon the sloped surface 168 and the biasing member 166 forces the locking member 162 toward the lock hole 160.

The hanger assembly 112 may include a pair of hanger wings 118 coupled to oppositely disposed ends of the hanger housing 114. The hanger wings 118 may each include garment contact surfaces that are contoured to slope downward relative to the seat assembly 100, similar to certain conventional clothes hangers. In some examples, the hanger wings 118 are configured to be extended from wing openings 132 in the hanger housing 114 while the hanger assembly 112 is in the deployed configuration and are configured to be retracted within the hanger housing 114 while the hanger assembly 112 is in the stowed configuration.

In some examples, actuation of the release mechanism (e.g., the push button 122) may be configured to cause transition of the hanger wings 118 to be extended from and retracted within the hanger housing 114. For example, FIGS. 10-11 represent the hanger housing 114 as including a hanger gear 146 (e.g., a two ratio gear) functionally coupled to each of the hanger wings 118 by gear rods 148 and functionally coupled to the push button 122. The hanger gear 146 may include a first set of gear teeth configured to interact with corresponding gear teeth (e.g., along a sidewall of a push button recess 144) on the push button 122 and a second set of gear teeth configured to interact with corresponding gear teeth on each of the gear rods 148. As the push button 122 moves upward in the push button cavity 134, the hanger gear 146 rotates forcing the gear rods 148 laterally outward and moving the hanger wings 118 out of the hanger housing 114. As the push button 122 moves downward in the push button cavity 134, the hanger gear 146 rotates forcing the gear rods 148 laterally inward and moving the hanger wings 118 into the hanger housing 114.

The hanger housing 114 may include guide slots 124 and each of the hanger wings 118 may include a guide pin 126 configured to extend into a corresponding one of the guide slots 124. The guide slots 124 and the guide pins 126, in combination, are configured to guide the hanger wings 118 when extending from or retracting into the hanger housing 114. That is, the guide pins 126 may slide within the guide slots 124 as the hanger wings 118 move within the hanger housing 114 and thereby maintain a vertical position of the hanger wings 118 relative to the hanger housing 114.

In some examples, the bracket 110 may include wing protrusions 158 configured to be received within wing recesses 174 of the hanger wings 118 while the housing assembly is in the stowed configuration. The wing recesses 174 and the wing protrusions 158, in combination, may secure the position of the hanger wings 118 within the hanger housing 114 while the hanger assembly 112 is in the stowed configuration.

Figure 17:
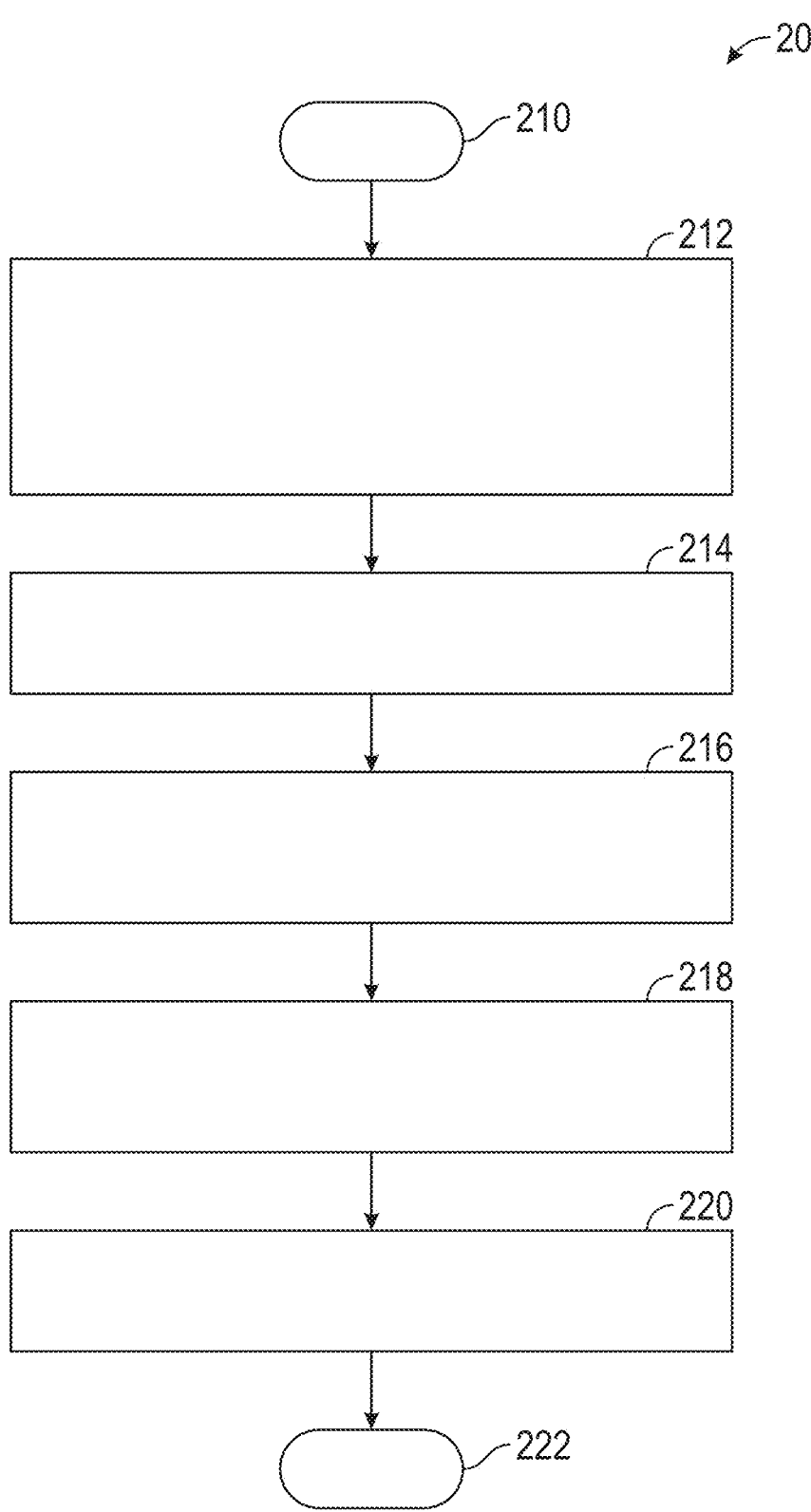
FIG. 17 is a flowchart illustrating a method for storing a garment in a vehicle in accordance with an example.

With reference now to FIG. 17 and with continued reference to FIGS. 1-16, a flowchart provides a method 200 for storing a garment in a vehicle, for example, as performed by the garment hanger apparatus 108 of the vehicle 10, in accordance with various examples. As can be appreciated in light of the disclosure, the order of operation within the method 200 is not limited to the sequential execution as illustrated in FIG. 17, but may be performed in one or more varying orders as applicable and in accordance with the present disclosure.

In one example, the method 200 may start at 210. At 212, the method 200 may include extending a hanger assembly 112 of a garment hanger apparatus 108 from a bracket 110 secured to the seatback 104 of the seat assembly 100. In some examples, the hanger assembly 112 may be extended from the bracket 110 by griping the push button 122 and the recess handgrip 120, and pressing the push button 122 toward the hanger housing 114 to unlock the extension members 116. The hanger assembly 112 may then be pulled from the bracket 110 until a maximum or desired position is achieved.

At 214, the method 200 may include locking the hanger assembly 112 in a deployed configuration. In some examples, the push button 122 may be released to allow the hanger assembly 112 to lock in the deployed configuration. At 216, the method 200 may include hanging a garment from surfaces of the hanger assembly 112 while in the deployed configuration.

At 218, the method 200 may include unlocking the hanger assembly 112 prior to retracting the hanger assembly 112 to the stowed configuration. In some examples, the hanger assembly 112 may be unlocked by pressing the push button 122. At 220, the method 200 may include retracting the hanger assembly 112 toward the bracket 110 to a stowed configuration. The method 200 may end at 222.

The garment hanger apparatuses, seat assemblies, vehicles, and methods disclosed herein provide various benefits over certain existing systems and methods. For example, the garment hanger apparatus 108 may allow for storage of garments within the vehicle 10 in a convenient manner that may not obstruct the view of the driver. In some examples, the hanger assembly 112 may retract into the bracket 110 to promote a compact structure while in the stowed configuration.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A garment hanger apparatus, comprising:
a bracket secured to a seatback of a seat assembly;
a hanger assembly configured to extend from the bracket to define a deployed configuration and to retract toward the bracket to define a stowed configuration, wherein the hanger assembly includes surfaces that are configured to support a garment hanging therefrom while in the deployed configuration, wherein the hanger assembly includes a pair of hanger wings coupled to oppositely disposed ends of the hanger assembly, the pair of hanger wings each including garment contact surfaces that are contoured to slope downward relative to the seat assembly, wherein the hanger assembly includes a hanger housing, and the pair of hanger wings are configured to be extended from the hanger housing when the hanger assembly is moved to the deployed configuration and are configured to be retracted within the hanger housing when the hanger assembly is moved to the stowed configuration, wherein the hanger housing includes guide slots and each of the pair of hanger wings includes a guide pin configured to extend into a corresponding one of the guide slots, wherein the guide slots and the guide pins in combination are configured to guide the pair of hanger wings when extending from or retracting into the hanger housing; and
one or more extension members coupling the hanger assembly to the bracket.

2. The garment hanger apparatus of claim 1, wherein the hanger assembly is lockable in both the deployed configuration and the stowed configuration, and the hanger assembly includes a release mechanism configured to unlock the hanger assembly to allow transition between the deployed configuration and the stowed configuration, wherein actuation of the release mechanism is configured to cause transition of the pair of hanger wings to be extended from or retracted within the hanger housing.

3. The garment hanger apparatus of claim 1, wherein the bracket includes wing protrusions configured to be received within wing recesses while the hanger assembly is in the stowed configuration.

4. The garment hanger apparatus of claim 1, wherein the hanger assembly is lockable in both the deployed configuration and the stowed configuration, and the hanger assembly includes a release mechanism configured to unlock the hanger assembly to allow for transition between the deployed configuration and the stowed configuration.

5. The garment hanger apparatus of claim 4, wherein each of the one or more extension members include an extension rod extending therein, a locking member therein that includes a locking pin, and a lock hole, wherein the locking member is biased such that the locking pin is preferentially received within the lock hole when the locking pin and the lock hole are aligned, wherein the hanger assembly is locked in position while the locking pin is within the lock hole, wherein actuation of the release mechanism causes a distal end of the extension rod to interact with the locking member and force the locking pin out of the lock hole to thereby unlock the hanger assembly.

6. The garment hanger apparatus of claim 1, wherein exterior surfaces of the hanger assembly are flush with or recess relative to exterior surfaces of the bracket while the hanger assembly is in the stowed configuration.

7. The garment hanger apparatus of claim 1, wherein the hanger assembly is configured to support the garment hanging therefrom while in the deployed configuration such that the garment is not in contact with the seatback.

8. A method, comprising:

extending a hanger assembly of a garment hanger apparatus from a bracket secured to a seatback of a seat assembly, wherein the hanger assembly is coupled to the bracket by one or more extension members;

locking the hanger assembly in a deployed configuration;

extending a pair of hanger wings from oppositely disposed ends of a hanger housing of the hanger assembly when the hanger assembly is moved to the deployed configuration, wherein the pair of hanger wings each include garment contact surfaces that are contoured to slope downward relative to the seat assembly;

guiding the pair of hanger wings when extending from or retracting into the hanger housing with a guide pin of each of the pair of hanger wings disposed within a guide slot of the hanger housing;

hanging a garment from surfaces of the hanger assembly while in the deployed configuration;

retracting the hanger assembly toward the bracket to a stowed configuration; and retracting the pair of hanger wings within the hanger housing when the hanger assembly is moved to the stowed configuration.

9. The method of claim 8, further comprising securing the pair of hanger wings within the bracket by receiving wing protrusions of the bracket within wing recesses of the pair of hanger wings while the hanger assembly is in the stowed configuration.

10. The method of claim 8, further comprising unlocking the hanger assembly prior to retracting the hanger assembly to the stowed configuration.

11. The method of claim 10, further comprising actuating a release mechanism to unlock and lock the hanger assembly to allow for transition between the deployed configuration and the stowed configuration, wherein each of the one or more extension members include an extension rod extending therein, a locking member therein that includes a locking pin, and a lock hole, wherein the locking member is biased such that the locking pin is preferentially received within the lock hole when the locking pin and the lock hole are aligned, wherein the hanger assembly is locked in position while the locking pin is within the lock hole, wherein actuation of the release mechanism causes a distal end of the extension rod to interact with the locking member and force the locking pin out of the lock hole to thereby unlock the hanger assembly.

12. The method of claim 8, wherein the garment is not in contact with the seatback while hanging from the hanger assembly.

13. A garment hanger apparatus, comprising:

a bracket secured to a seatback of a seat assembly;

a hanger assembly configured to extend from the bracket to define a deployed configuration and to retract toward the bracket to define a stowed configuration, wherein the hanger assembly includes surfaces that are configured to support a garment hanging therefrom while in the deployed configuration, wherein the hanger assembly is lockable in both the deployed configuration and the stowed configuration, and the hanger assembly includes a release mechanism configured to unlock the hanger assembly to allow for transition between the deployed configuration and the stowed configuration; and one or more extension members coupling the hanger assembly to the bracket, wherein each of the one or more extension members include an extension rod extending therein, a locking member therein that includes a locking pin, and a lock hole, wherein the locking member is biased such that the locking pin is preferentially received within the lock hole when the locking pin and the lock hole are aligned, wherein the hanger assembly is locked in position while the locking pin is within the lock hole, wherein actuation of the release mechanism causes a distal end of the extension rod to interact with the locking member and force the locking pin out of the lock hole to thereby unlock the hanger assembly.

14. The garment hanger apparatus of claim 13, wherein the hanger assembly includes a pair of hanger wings coupled to oppositely disposed ends of the hanger assembly, the pair of hanger wings each including garment contact surfaces that are contoured to slope downward relative to the seat assembly.

15. The garment hanger apparatus of claim 14, wherein the hanger assembly includes a hanger housing, and the pair of hanger wings are configured to be extended from the hanger housing when the hanger assembly is moved to the deployed configuration and are configured to be retracted within the hanger housing when the hanger assembly is moved to the stowed configuration.

16. The garment hanger apparatus of claim 15, wherein the hanger assembly is lockable in both the deployed configuration and the stowed configuration, and the hanger assembly includes a release mechanism configured to unlock the hanger assembly to allow transition between the deployed configuration and the stowed configuration, wherein actuation of the release mechanism is configured to cause transition of the pair of hanger wings to be extended from or retracted within the hanger housing.

17. The garment hanger apparatus of claim 15, wherein the hanger housing includes guide slots and each of the pair of hanger wings includes a guide pin configured to extend into a corresponding one of the guide slots, wherein the guide slots and the guide pins in combination are configured to guide the pair of hanger wings when extending from or retracting into the hanger housing.

18. The garment hanger apparatus of claim 15, wherein the bracket includes wing protrusions configured to be received within wing recesses while the hanger assembly is in the stowed configuration.

19. The garment hanger apparatus of claim 13, wherein exterior surfaces of the hanger assembly are flush with or recess relative to exterior surfaces of the bracket while the hanger assembly is in the stowed configuration.

20. The garment hanger apparatus of claim 13, wherein the hanger assembly is configured to support the garment hanging therefrom while in the deployed configuration such that the garment is not in contact with the seatback.

* * * * *